United States Patent [19]

Puchta

[11] 4,406,175
[45] Sep. 27, 1983

[54] REMOTE CONTROL DEVICE FOR A CHANGE-SPEED GEAR ARRANGEMENT OF A MOTOR VEHICLE

[75] Inventor: Herbert Puchta, Remshalden, Fed. Rep. of Germany

[73] Assignee: Daimler-Benz Aktiengesellschaft, Stuttgart, Fed. Rep. of Germany

[21] Appl. No.: 253,878

[22] Filed: Apr. 13, 1981

[30] Foreign Application Priority Data

Apr. 11, 1980 [DE] Fed. Rep. of Germany ....... 3014067

[51] Int. Cl.$^3$ .......................... G05G 9/16; B62D 33/06
[52] U.S. Cl. .................................... 74/473 R; 180/328
[58] Field of Search ................ 74/473 R, 475, 476, 74/477; 180/328

[56] References Cited

U.S. PATENT DOCUMENTS

| | | | |
|---|---|---|---|
| 2,854,088 | 9/1958 | Dence | 180/328 |
| 3,329,229 | 7/1967 | Mukho | 74/473 R |
| 3,645,145 | 2/1972 | Galas | 74/473 R |
| 3,805,635 | 4/1974 | Grosseau | 74/473 R |

*Primary Examiner*—Allan D. Herrmann
*Attorney, Agent, or Firm*—Craig & Burns

[57] ABSTRACT

A remote control device for a speed-change transmission of a motor vehicle. A joint carrier, articulated to a vehicle part by a joint with a joint center immovable with respect to shifting movements, is connected by a universal joint with a gear shift rod leading to a gear shift device in the speed-change transmission and is adapted to be actuated to pivotal movements about the immovable joint center by a gear shift lever in a selection plane as well as in at least one shifting plane extending at right angles to the selection plane. A joint axis of a pair of pivots of the universal joint cooperating with the gear shift rod lies within or in parallel to the selection plane. The gear shift lever is pivotably mounted to a vehicle part by a second joint having a joint center immovable with respect to the shifting movements by lying offset or spaced from the immovable joint center of the joint carrier. An otherwise freely swingable connecting linkage is repsectively connected to the gear shift lever and joint carrier by individual joints with the two joints of the connecting linkage having the same pivoting direction with respect to the associated immovable joint centers in the directions of the shifting plane as well as respectively merely a degree of pivoting freedom with a pivot axis lying within or in parallel to the shifting plane.

11 Claims, 1 Drawing Figure

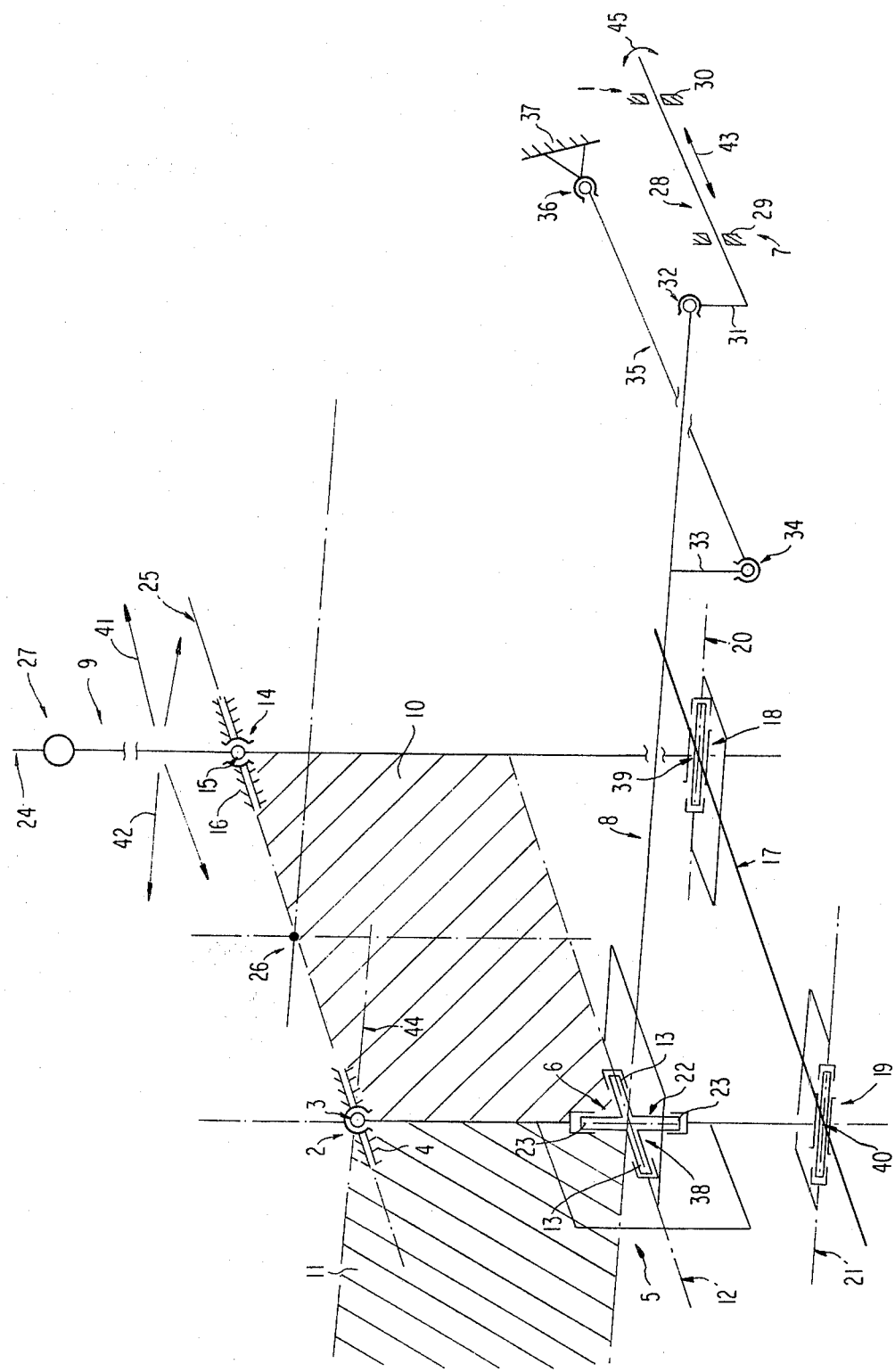

REMOTE CONTROL DEVICE FOR A CHANGE-SPEED GEAR ARRANGEMENT OF A MOTOR VEHICLE

The present invention relates to a remote control arrangement and, more particularly, to a remote control device for a change-speed gear or transmission of a motor vehicle, wherein a joint carrier, articulated to a vehicle part by a joint with a joint center removable with respect to shifting movements, is connected by means of a universal joint with a gear shift rod leading to a gear shift device in the speed-change gear and may be actuated by pivotal movements about its immovable joint center by a gear shift lever in a selection plane as well as in at least one shifting plane at right angles to the selection plane, and with the joint axis of a pair of pivots of the universal joint cooperating with the gear shift rod lying within or in parallel to the selection plane.

A remote control device or remote control gear shifting device of the aforementioned type is proposed in German Auslegeschrift No. 2,159,195, wherein a joint with an immovable joint center of a joint carrier is likewise fashioned as a universal joint, wherein a conventional joint carrier, based on a longitudinal axis defined by the joint centers of the two universal joints, includes bearing zones for the pivots of the two universal joints for each of the two joint centers, with the bearing zones extending in a direction of the longitudinal axis and lying at right angles to the longitudinal axis, and with all bearing zones as well as the universal joints having identical dimensions.

The purpose of the aforementioned proposed type of remote control device is to provide the joint carrier or support with a well-wearing design as well as to permit a great variety of installation and connection possibilities in order to restore a selection and shifting direction in all cases which occur to the required standing shifting pattern at the gear shift lever without the necessity of exchanging individual parts.

A disadvantage of the aforementioned proposed remote control device resides in the fact that the gear shift lever is attached directly to the joint carrier proper so that the bearing zone of the gear shift lever and an axis of the gear shift rod lie in a common vertical longitudinal plane of the vehicle. In the proposed remote control device, the position of the two joint centers of the universal joints at the joint carrier or support may be exchanged relatively to a mounting point of the gear shift lever so that a rotating and displacement movement of a main shaft can be selected to be in a same direction or oppositely to a corresponding movement of the gear shift lever. Additionally, one universal joint of the joint carrier or support permits rotational movement about a vertical axis so that an installation of this joint carrier into the vehicle is insensitive to deviations from an intended position.

In German Offenlegungsschrift No. 2,100,201, a further remote control device, not of the same type as involved in the present invention, is proposed which is intended for a speed-change gear of a motor vehicle, wherein a bearing zone of a gear shift lever and an axis of the gear shift rod are arranged in a common vertical longitudinal plane or in closely adjacent vertical longitudinal planes. The connecting linkage is respectively connected through one joint with the gear shift lever and with one lever arm of a rocker arm operating as a balance arm, with the other lever arm being fixedly connected to one end of the gear shift rod. The rocker arm is supported in a central region through a ball and socket joint on all sides pivotable on a joint carrier, with the carrier being arranged so as to be pivotable about a joint axis lying at right angles to an axis of the gear shift rod and being immovable with respect to the shifting movements.

In German Offenlegungsschrift No. 2,326,207, yet another remote control device for a speed-change gear of a motor vehicle, not of the same type involved in the present invention, is proposed, wherein a bearing zone of a gear shift lever and an axis of the gear shift rod are located in a common vertical longitudinal plane or in closely juxtaposed vertical longitudinal planes of the vehicle. A connecting linkage is connected by a single axle joint with the gear shift lever and by a universal joint with an eccentric arranged at an end of the gear shift rod lying oppositely to the speed-change gear. A joint carrier with two mutually parallel joint axles lying at right angles to the axis of the gear shift rod is disposed in a zone of the gear shift rod adjoining the eccentric. The joint carrier or support is mounted so as to be pivotable about one joint axle, with the axle being immovable with respect to the shifting movements. The gear shift rod is fixed within a bearing housing which is mounted so as to be pivotable about the other joint axle of the joint carrier.

The aim underlying the present invention essentially resides in providing a remote control device for a speed-change gear or transmission of a motor vehicle with right hand steering wherein an arrangement and mounting of the speed-change gear and gear shift rod is constructed as in the case of a vehicle equipped with left-hand steering.

In accordance with advantageous features of the present invention, a gear shift lever is pivotably mounted to a vehicle part by means of a second joint having a joint center which is immovable with respect to the shifting movements but lying offset with respect to the immovable joint center of the joint carrier. A connecting linkage otherwise freely swingable is respectively connected by one joint with the gear shift lever and the joint carrier. The two joints of the connecting linkage exhibit the same pivoting direction with respect to an associated immovable joint center in directions of the shifting plane as well as respectively merely a degree of pivoting freedom with a pivoting axis lying within or in parallel to the shifting plane.

Advantageously, in accordance with further features of the present invention, a universal joint is arranged at a point of the joint carrier lying between the joint for the connecting linkage and the joint with the immovable joint center.

According to the present invention, the joint with the immovable joint center of the joint carrier is constituted, advantageously, by a ball and socket joint.

According to the present invention, a joint axis of the pair of pivots of the universal joint cooperating with the joint carrier or support includes, in an activated neutral position of the gear shift lever, an approximately upright position.

Accordingly, it is an object of the present invention to provide a remote control device for a speed-change gear or transmission of the motor vehicle which avoids, by simple means, shortcomings and disadvantages encountered in the prior art.

Another object of the present invention resides in providing a remote control device for a speed change gear or transmission of a motor vehicle which is simple in construction and therefore relatively inexpensive to manufacture.

A still further object of the present invention resides in providing a remote control device for the speed change gear or transmission of a motor vehicle which ensures a smooth shifting operation.

These and other objects, features, and advantages of the present invention will become more apparent from the following description when taken in connection with the accompanying drawing which shows, for the purpose of illustration only, one embodiment in accordance with the present invention, and wherein:

The single FIGURE is a schematic view of a remote control device for a speed-change gear or transmission of a motor vehicle constructed in accordance with the present invention.

Referring now to the single FIGURE of the drawing, according to this FIGURE, ball and socket joints generally designated by the reference numerals 2 and 14 are respectively mounted to fixed vehicle parts 4 and 16 of, for example, a titlable drivers cab of a motor vehicle, with joint centers generally designated by the reference numerals 3 and 15 of the joints 2, 14 being immovable with respect to shifting movements of a gear shift lever generally designated by the reference numeral 9. An axis generally designated by the reference numeral 25 lying at right angles to a longitudinal direction of the vehicle forms a geometrical site for the joint centers 3, 15, with the axis 25 being intersected at a point generally designated by the reference numeral 26 by a vertical longitudinal plane of symmetry of the motor vehicle.

The gear shift lever 9, pivotably mounted in a central zone thereof by the joint 14 formed as a ball and socket joint, includes a gear shift knob of handle generally designated by the reference numeral 27 at an upper end thereof for operation by a driver and includes, at a lower end thereof for connection to a connecting linkage generally designated by the reference numeral 17, a single axle joint generally designated by the reference numeral 18 having a pivot or swivel axle generally designated by the reference numeral 20. The connecting linkage 17, which is otherwise freely swingable, is joined at its other end through a further single axle joint generally designated by the reference numeral 19 to a pivot axle generally designated by the reference numeral 21 with a joint carrier generally designated by the reference numeral 5 which is suspended at its upper end at the drivers cab by means of the joint 2 also formed as a ball and socket joint.

A joint carrier is connected, in a central region or area thereof, by a universal joint generally designated by the reference numeral 6 to a gear shift rod generally designated by the reference numeral 8 leading to a speed-change gear or transmission generally designated by the reference numeral 1 and mounted at a chassis portion of the motor vehicle behind the driver's cab.

A gear shifting device generally designated by the reference numeral 7 of the speed-change gear or transmission 1 is provided with only one main shaft formed as a selector or gear shift shaft generally designated by the reference numeral 28 is mounted so as to be rotatably and axially displaceable in bearings 29 and 30 of the transmission. The shaft 28 includes an eccentric 31 at an end thereof projecting from a housing of the speed-change gear or transmission 1, with a rear end of the gear shift rod 8 being articulated through a joint generally designated by the reference numeral 32 to the eccentric 31. The gear shift rod 8 has a fixed lever arm 33 which lies in proximity to the speed-change gear or transmission 1. A supporting control arm generally designated by the reference numeral 35 is articulated to the lever arm 33 through a joint generally designated by the reference numeral 34. The supporting control arm 35 is, in turn, supported through a joint generally designated by the reference numeral 36 at a vehicle part 37 fixedly disposed with respect to a chassis of the motor vehicle or the change-speed gear or transmission 1.

The gear shift rod 8 is constructed so as to be telescopically extensible in order to enable a drivers cab to execute the necessary tilting movements during a tilting over of the cab. The gear shift rod 8 extends in a longitudinal vehicle direction and is disposed, together with the universal joint 6 and the joint 32, at the main shaft 28, on a left hand side of the longitudinal plane of symmetry of the vehicle as with the case of a vehicle provided with left hand steering; whereas, the gear shift lever 9 and associated ball and socket joint 14 is located on a right hand side of the vertical longitudinal plane of symmetry of the motor vehicle in which is disposed the point 26.

To select shifting paths, the gear shift lever 9 is pivoted in a direction of the double arrow 41 in a substantially upright gear shift selecting plane indicated by the shading 10, with the plane approximately containing the axis 25, joint centers 38, 39, 40 of the joints 6, 18, 19 executing path movements about their respective immovable joint centers 3 and 15 in the selecting plane 10 and/or in planes extending in parallel thereto. Since the axis 12 of the pair of pivots 13—13 of the universal joint 6 cooperating with the gear shift rod 8 is arranged in or in parallel to the selecting plane, and the gear shift rod 8 is supported through the control arm 35 on the fixed joint 36 during this step, the gear shift rod operates through its joint 32 the main shaft 28 in the direction of the double headed arrow 43. The thus occurring relative pivoting movements of the connecting linkage 17 with respect to the gear shift lever 9 and the joint carrier 5 are made possible by virtue of the fact that the axles 20 and 21 of the joints 18, 19 are arranged approximately perpendicularly or at right angles to the selecting plane 10.

In the illustrated neutral position generally designated by the reference numeral 24 of the gear shift lever 9, the joint center 38 of the universal joint 6 lies in an approximately vertical shifting plane 11 indicated by the shading in the FIGURE, with the plane containing an axis generally designated by the reference numeral 44 passing through the joint center 3 and standing approximately perpendicular to the selecting plane 10. The shifting plane 11 is pivoted about the axis 44 when selecting the shifting paths or lanes.

To shift gears, the gear shift lever 9 is operated in the direction of the arrow 42, with joint centers 39 and 40 of the joints 18 and 19 executing path or planetary movements about the respectively associated immovable joint centers 15 or 3, extending in parallel to the shifting plane 11. In the shifting movements, the degree of freedom of the joints 18 and 19 must be zero and this is accomplished by aligning the respective joint axes 20 and 21 at least approximately in parallel to the shifting plane 11.

Due to the pivotal movement of the joint carrier 5 in the shifting plane 11, enforced during a gear shifting, the gear shift rod actuates the main shaft 28 in a direction of rotation indicated by the arrow 45.

Since the gear shift rod 8 is connected through the universal joint 6 with the drivers cab and through the joints 32 and 34 with the chassis of the motor vehicle, and a lateral displacement can occur between the drivers cab and the chassis, the axis 22 of the pivot pair 23—23 of the universal joint 6 cooperating with the joint carrier 5 is arranged so that it is approximately upright in a neutral position 24 of the gear shift lever 9.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A remote control device for a speed-change transmission of a motor vehicle, the control device comprising a gear shift lever means adapted to execute shifting movements in a gear selection plane and a gear shifting plane extending substantially at a right angle to the gear selection plane, a gear shift rod means connected to a gear shifting device of the transmission, a joint carrier means, first joint means for articulatingly connecting the joint carrier means with a vehicle part, the first joint means including a joint center immovable with respect to the shifting movements, and a universal joint means for connecting the joint carrier means with the gear shift rod means, said joint carrier means is adapted to be actuated in pivotal movements about the immovable joint center by the gear shift lever means, a second joint means is provided for pivotably mounting the gear shift lever means to a vehicle part, the second joint means includes a joint center immovable with respect to the shifting movements and offset with respect to the joint center of the first joint means, a freely swingable connecting linkage means is interposed between the gear shift lever means and the joint carrier means, a third joint means is provided for connecting a first end of the linkage means with the gear shift lever means, a fourth joint means is provided for connecting a second end of the linkage means with the joint carrier means, and the third and fourth joint means are arranged so as to have the same pivoting direction with respect to the associated immovable joint centers in a direction of the shifting plane and respectively a degree of pivotal movement along a pivot axis lying one of within and parallel to the shifting plane.

2. The remote control device according to claim 1, wherein the universal joint means includes a pair of pivots joined along a joint pivot axis lying one of within and in parallel to the gear selection plane.

3. The remote control device according to claim 2, wherein the universal joint means is arranged at the joint carrier means at a position lying between the fourth joint means and the first joint means.

4. The remote control device according to one of claims 2, or 3, wherein the first joint means is formed as a ball and socket joint.

5. The remote control device according to claim 4, wherein the universal joint means includes a further pair of pivots joined along a further joint pivot axis which extends, in a neutral position of the gear shift lever means, in an approximately vertical direction.

6. The remote control device according to claim 5, wherein the gear shifting device includes a gear shift shaft mounted in the transmission for axial and rotatable movement, the gear shift shaft includes an eccentric means mounted on one end thereof, and a further joint means is provided for connecting the eccentric means with an end of the gear shift rod means.

7. The remote control device according to claim 6, wherein a fixed lever arm is provided on the gear shift rod means in proximity to the transmission, a supporting control arm is articulated to the gear shift rod means and a part of one of the transmission and a chassis of the motor vehicle.

8. The remote control device according to claim 7, wherein the gear shift lever means is arranged on a right hand side of a longitudinal plane of symmetry of the motor vehicle and the gear shift rod means is arranged on a left hand side of the longitudinal plane of symmetry of the motor vehicle.

9. The remote control device according to claim 1, wherein the universal joint means includes a pair of pivots defining a joint pivot axis for an end of the gear shift rod means, and the joint pivot axis is arranged in one of within and parallel to the selecting plane.

10. The remote control device according to claim 9, wherein the universal joint means includes a further pair of pivots defining a further joint pivot axis for the joint carrier means, and the further joint pivot axis extends, in a neutral position of the gear shift lever means, in an approximately vertical direction.

11. The remote control device according to one of claims 1, 9 or 10, wherein the gear shift lever means is arranged on a right hand side of a longitudinal plane of symmetry of the motor vehicle and the gear shift rod means is arranged on a left hand side of the longitudinal plane of symmetry of the motor vehicle.

* * * * *